(12) United States Patent
Choi et al.

(10) Patent No.: US 12,309,309 B2
(45) Date of Patent: May 20, 2025

(54) MOBILE COMMUNICATION TERMINAL

(71) Applicant: Kyuhyuk Choi, Seoul (KR)

(72) Inventors: Kyuhyuk Choi, Seoul (KR); Sungki Baek, Hwaseong-si (KR)

(73) Assignee: Kyuhyuk Choi, Seoul (KR)

( * ) Notice: Subject to any disclaimer, the term of this patent is extended or adjusted under 35 U.S.C. 154(b) by 382 days.

(21) Appl. No.: 17/944,864

(22) Filed: Sep. 14, 2022

(65) Prior Publication Data

US 2023/0017668 A1    Jan. 19, 2023

Related U.S. Application Data

(63) Continuation of application No. PCT/KR2021/002596, filed on Mar. 3, 2021.

(30) Foreign Application Priority Data

Mar. 16, 2020 (KR) ........................ 10-2020-0031745

(51) Int. Cl.
H04M 1/72448 (2021.01)
G02B 23/08 (2006.01)
(Continued)

(52) U.S. Cl.
CPC ........ H04M 1/72448 (2021.01); G02B 23/08 (2013.01); H04M 1/0264 (2013.01);
(Continued)

(58) Field of Classification Search
CPC .......... G02B 23/04; G02B 23/08; G02B 3/12; H04M 1/72448; H04M 1/0264;
(Continued)

(56) References Cited

U.S. PATENT DOCUMENTS

2016/0161733 A1    6/2016  Li ......................... G03B 23/08
2020/0051335 A1*  2/2020  Antypov ............... G06F 3/0346

FOREIGN PATENT DOCUMENTS

JP            7479666 B2 *  5/2024
KR    10-2012-0138334 A    12/2012
(Continued)

OTHER PUBLICATIONS

Korean Office Action mailed Dec. 14, 2020, issued to corresponding Korean Application No. 10-2020-0031745.
(Continued)

Primary Examiner — Mehmood B. Khan
(74) Attorney, Agent, or Firm — Stein IP, LLC

(57) ABSTRACT

According to one aspect of the technique of the present disclosure, there is provided a mobile communication terminal. The mobile communication terminal includes a main body, a display disposed at a front surface of the main body, a first camera group disposed at the front surface and including one or more cameras, a second camera group disposed at a rear surface of the main body that is opposite to the front surface and including one or more cameras, a third camera disposed at a first installation surface of the main body, which is different from the front surface and the rear surface, and an operation processor configured to: (a) display on the display an image selected from among a first image received through the first camera group, a second image received through the second camera group, and a third image received through the third camera.

14 Claims, 16 Drawing Sheets

(51) Int. Cl.
    *H04M 1/02*           (2006.01)
    *H04N 23/51*         (2023.01)
    *H04N 23/55*         (2023.01)
    *H04N 23/90*         (2023.01)

(52) U.S. Cl.
    CPC ............. *H04N 23/51* (2023.01); *H04N 23/55* (2023.01); *H04N 23/90* (2023.01); *H04M 2201/42* (2013.01)

(58) Field of Classification Search
    CPC ... H04M 2201/42; H04N 23/55; H04N 23/45; H04N 23/90; H04N 23/51
    See application file for complete search history.

(56) References Cited

FOREIGN PATENT DOCUMENTS

| | | | | |
|---|---|---|---|---|
| KR | 10-2013-0104764 | | 9/2013 | |
| KR | 10-2016-0053428 A | | 5/2016 | |
| KR | 10-2016-0076736 A | | 7/2016 | |
| KR | 10-2017-0083937 A | | 7/2017 | |
| KR | 20170083937 A | * | 7/2017 | .......... H04M 1/0264 |
| KR | 10-2214199 B1 | | 2/2021 | |
| WO | WO-2016072538 A1 | * | 5/2016 | .............. H04B 1/38 |

OTHER PUBLICATIONS

International Search Report mailed Jun. 9, 2021, issued to corresponding International Application No. PCT/KR2021/002596.

\* cited by examiner

100

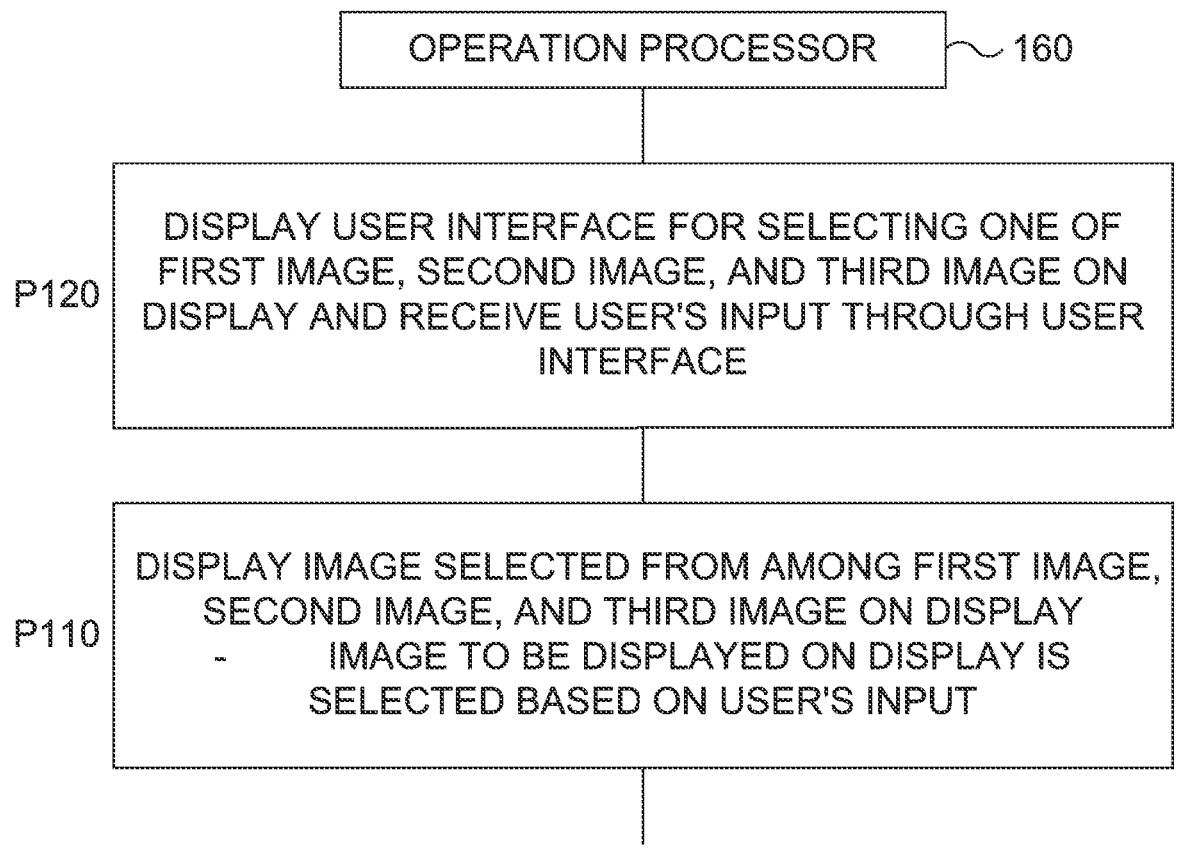

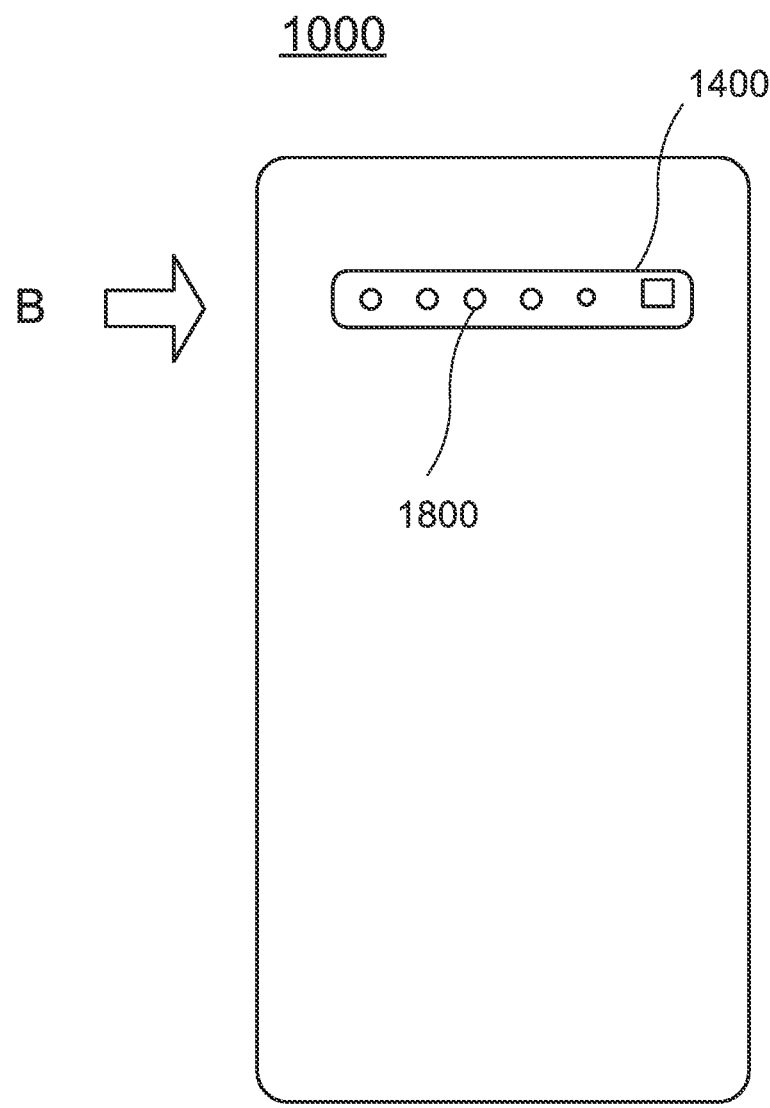

<Related Art>

<Related Art>

MOBILE COMMUNICATION TERMINAL

CROSS-REFERENCE TO RELATED PATENT APPLICATION

This non-provisional U.S. patent application is a bypass continuation application of PCT International Application No. PCT/KR2021/002596, filed on Mar. 3, 2021, in the WIPO, the international application being based upon and claiming the benefit of priority from Korean Patent Application No. 10-2020-0031745, filed on Mar. 16, 2020, in the Korean Intellectual Property Office, the entire contents of which are hereby incorporated by reference.

BACKGROUND

1. Field

The present disclosure relates to a mobile communication terminal.

2. Related Art

A mobile communication terminal may provide various functions in addition to the phone call function. For example, the mobile communication terminal may include a processor and execute various applications by using an operating system running on the processor. In addition, the mobile communication terminal may include a camera for capturing still images or videos and various sensors for detecting various information. The mobile communication terminal capable of executing various applications and having a camera and various sensors is generally referred to as a "smartphone."

In order to differentiate the smart phone, in particular, to differentiate the camera function, a smart phone having an optical zooming function has been developed and released.

FIGS. 10A and 10B are diagrams schematically illustrating a configuration of a smart phone 1000 according to a comparative example. FIG. 10A is a diagram schematically illustrating a front surface of a main body 1100 of the smart phone 1000 according to the comparative example, and FIG. 10B is a diagram schematically illustrating a rear surface of the main body 1100 of the smart phone 1000 according to the comparative example. In the specification, the "front surface" of the main body 1100 of the smart phone 1000 refers to a surface on which a display 1200 is disposed among surfaces of the main body 1100 of the smart phone 1000, and the "rear surface" refers to a surface opposite to the surface (i.e., the front surface) on which the display 1200 is disposed among the surfaces of the main body 1100 of the smart phone 1000. In FIG. 10A, a left side surface of the main body 1100 is indicated by an arrow "A," a right side surface of the main body 1100 is indicated by an arrow "B," a top surface of the main body 1100 is indicated by an arrow "C," and a bottom surface of the main body 1100 is indicated by an arrow "D."

Referring to FIGS. 10A and 10B, a smart phone 1000 according to the comparative example includes the main body 1100, the display 1200, a front camera module 1300, and a rear camera module 1400.

The main body 1100 may be made of, for example, a material such as plastic or metal.

The display 1200 may include, for example, an organic light-emitting diode (OLED) display. The front camera module 1300 may include, for example, one or more cameras for taking a selfie. The rear camera module 1400 may include, for example, a flash and one or more cameras for zooming an image and taking a wide-angle image and an ultrawide-angle image.

FIGS. 11A and 11B are diagrams schematically illustrating a configuration of a camera 1800 of the smart phone 1000 according to the comparative example, which is viewed from the direction of the arrow "B" shown in FIG. 10B (i.e., the right side surface of the main body 1100). The camera 1800 may be, for example, any one of the one or more cameras provided in the front camera module 1300 and the rear camera module 1400. FIGS. 11A and 11B illustrate a case in which the camera 1800 is one of the one or more cameras provided in the rear camera module 1400.

Referring to FIG. 11A, the camera 1800 includes a cover window 1810, a first reflector 1830, one or more lenses 1850, a second reflector 1870, and an image sensor 1890.

The cover window 1810 may be made of, for example, transparent plastic or glass.

Each of the first reflector 1830 and the second reflector 1870 may include, for example, a beam splitter such as a prism.

The one or more lenses 1850 are arranged along an optical axis. For example, the one or more lenses 1850 may include lenses such as liquid lenses and glass lenses. An overall refractive index of the one or more lenses 1850 may be adjustable. In other words, the overall refractive index of the one or more lenses 1850 may be changed in response to an electrical control or a mechanical control. Hereinafter, the one or more lenses 1850 are also referred to as a "refractor 1850."

Light incident from a target object passes through the cover window 1810 and travels to the first reflector 1830. Then, the light is reflected by the first reflector 1830 and passes through the refractor 1850. The light passing through the refractor 1850 is reflected by the second reflector 1870 and travels to the image sensor 1890. The image sensor 1890 processes the light to obtain an image.

As shown in FIG. 11B, the camera 1800 may include the cover window 1810, the first reflector 1830, the refractor 1850, and the image sensor 1890. According to the configuration shown in FIG. 11B, light passing through the refractor 1850 directly travels to the image sensor 1890, and the image sensor 1890 processes the light to obtain an image.

FIGS. 11A and 11B schematically show the configuration of the camera 1800, the configuration of the camera 1800 is not limited thereto. For example, a filter (not shown) may be disposed between the cover window 1810 and the first reflector 1830. The filter may filter light passing through the cover window 1810.

As in the configuration shown in FIG. 11A or the configuration shown in FIG. 11B, the camera using the first reflector 1830 and the second reflector 1870 or the camera using only one of the first reflector 1830 and the second reflector 1870 is generally referred to as "the camera using a periscope structure." Hereinafter, the camera 1800 is simply referred to as a "periscope camera 1800."

The smart phone 1000 according to the comparative example employs the periscope camera 1800 because the refractor 1850 is disposed to extend not in a thickness direction ("T" direction shown in FIG. 11A) of the main body 1100 of the smart phone 1000 but in a longitudinal direction ("L" direction shown in FIG. 11A) of the main body 1100 of the smart phone 1000. Specifically, as described above, the front camera module 1300 and the rear camera module 1400 of the smart phone 1000 are disposed on the front surface and the rear surface of the main body 1100 of the smart phone 1000, respectively, and the refractor 1850 occupies a long space in the optical axis direction. Therefore, it is difficult to arrange the refractor 1850 in the thickness direction T of the main body 1100 of the smart phone 1000. In particular, in order to use the optical zooming function, the dimension of the refractor 1850 needs to be greater than or equal to a specific value. Therefore, it is difficult to arrange the refractor 1850 in the thickness direction T of the main body 1100 of the smart phone 1000.

Further, in the aforementioned periscope camera 1800, it is necessary to control, for example, the first reflector 1830 in order to correct external factors such as unwanted movements (e.g., shaking) of the smart phone 1000. For example, when an unwanted rotation (e.g., shaking) of the smart phone 1000 occurs in a clockwise direction, the first reflector 1830 is controlled to rotate counterclockwise in response thereto to compensate for the unwanted clockwise rotation. Therefore, the configuration of the periscope camera 1800 becomes complicated.

As shown in FIGS. 10A and 10B, each of the front camera module 1300 and the rear camera module 1400 includes the one or more cameras. Here, distances between adjacent cameras included in the front camera module 1300 are limited by the dimension of the front camera module 1300 and distances between adjacent cameras included in the rear camera module 1400 are limited by the dimension of the rear camera module 1400.

For example, in the case of obtaining a three-dimensional image, two images having binocular parallax therebetween are acquired with two cameras, and then the three-dimensional image is generated by using the two images. If a distance between the two cameras is short, it is difficult to smoothly acquire the three-dimensional image. In the case of the smart phone 1000 according to the comparative example, the above-described two cameras for acquiring the three-dimensional image are disposed, for example, in the rear camera module 1400. Therefore, the distance between the two cameras is also limited by the dimension of the rear camera module 1400.

Further, even in the case of measuring a distance from the cameras to a target object by using, for example, the phase difference between the two cameras, if the distance between the two cameras is short, it is difficult to accurately measure the distance from the cameras to the target object.

Further, even in the case of obtaining a wide-angle image (or an ultrawide-angle image) with two cameras, if the distance between the two cameras is short, an image of the periphery of the target object may be distorted.

RELATED ART

Patent Document

Patent Document 1: US Patent Application Publication No. US 2016/0161733.

SUMMARY

It is an object of the technique of the present disclosure to provide a mobile communication terminal capable of smoothly capturing an image such as an optical zoom image by using one or more cameras disposed at an installation surface different from a front surface on which a display is disposed and a rear surface opposite to the front surface among six surfaces of a main body of the mobile communication terminal; smoothly capturing a three-dimensional image by using two cameras that are respectively disposed at a first installation surface and a second installation surface to be spaced apart from each other; accurately measuring a distance from the cameras to a target object; and smoothly capturing a wide-angle image or an ultrawide-angle image.

In view of the above, according to one aspect of the technique of the present disclosure, there is provided a mobile communication terminal including: a main body; a display disposed at a front surface of the main body; a first camera group disposed at the front surface of the main body and including one or more cameras; a second camera group disposed at a rear surface of the main body that is opposite to the front surface of the main body and including one or more cameras; a third camera disposed at a first installation surface of the main body, the first installation surface being different from the front surface and the rear surface; and an operation processor configured to (a) display on the display an image selected from among a first image received through the first camera group, a second image received through the second camera group, and a third image received through the third camera.

According to the technique of the present disclosure, there is provided a mobile communication terminal capable of smoothly capturing an image such as an optical zoom image by using one or more cameras disposed at an installation surface different from a front surface on which a display is disposed and a rear surface opposite to the front surface among six surfaces of a main body of the mobile communication terminal; smoothly capturing a three-dimensional image by using two cameras that are respectively disposed at a first installation surface and a second installation surface to be spaced apart from each other; accurately measuring a distance from the cameras to a target object; and smoothly capturing a wide-angle image or an ultrawide-angle image.

BRIEF DESCRIPTION OF THE DRAWINGS

FIG. 4 is a diagram illustrating an example of processes performed by an operation processor of the mobile communication terminal according to the embodiments of the technique of the present disclosure.

FIGS. 10A and 10B are diagrams schematically illustrating a configuration of a smart phone according to a comparative example.

DETAILED DESCRIPTION

Figure 1:
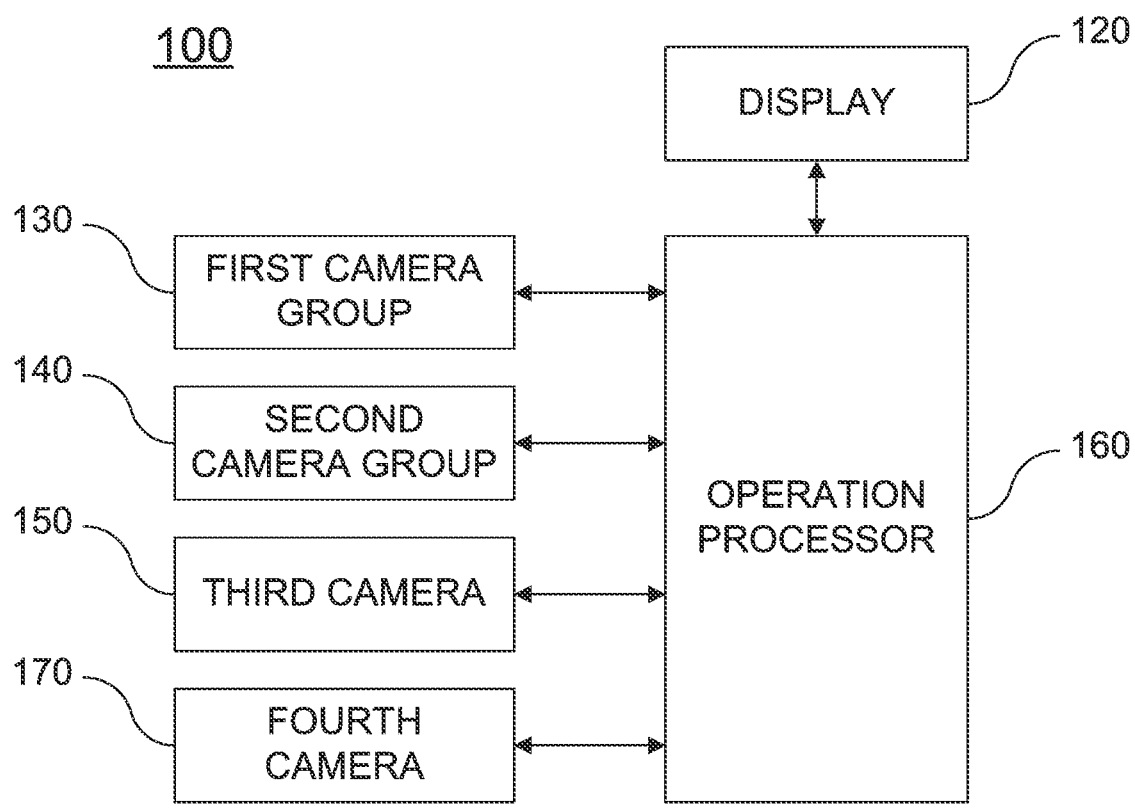
FIG. 1 is a block diagram schematically illustrating an exemplary configuration of a mobile communication terminal according to one or more embodiments of the technique of the present disclosure.

Hereinafter, one or more embodiments (also simply referred to as "embodiments") of a mobile communication terminal according to the technique of the present disclosure will be described mainly with reference to the drawings. Meanwhile, in the drawings for describing the embodiments of the technique of the present disclosure, for the sake of convenience of description, only a part of the practical configurations may be illustrated or the practical configurations may be illustrated while a part of the practical configurations is omitted or changed. Further, relative dimensions and proportions of parts therein may be exaggerated or reduced in size.

EMBODIMENTS

FIG. 1 is a block diagram schematically illustrating an exemplary configuration of a mobile communication terminal 100 according to the embodiments of the technique of the present disclosure. FIGS. 2A through 2F are diagrams schematically illustrating the exemplary configuration of the mobile communication terminal 100 according to the embodiments of the technique of the present disclosure.

Figure 2A:
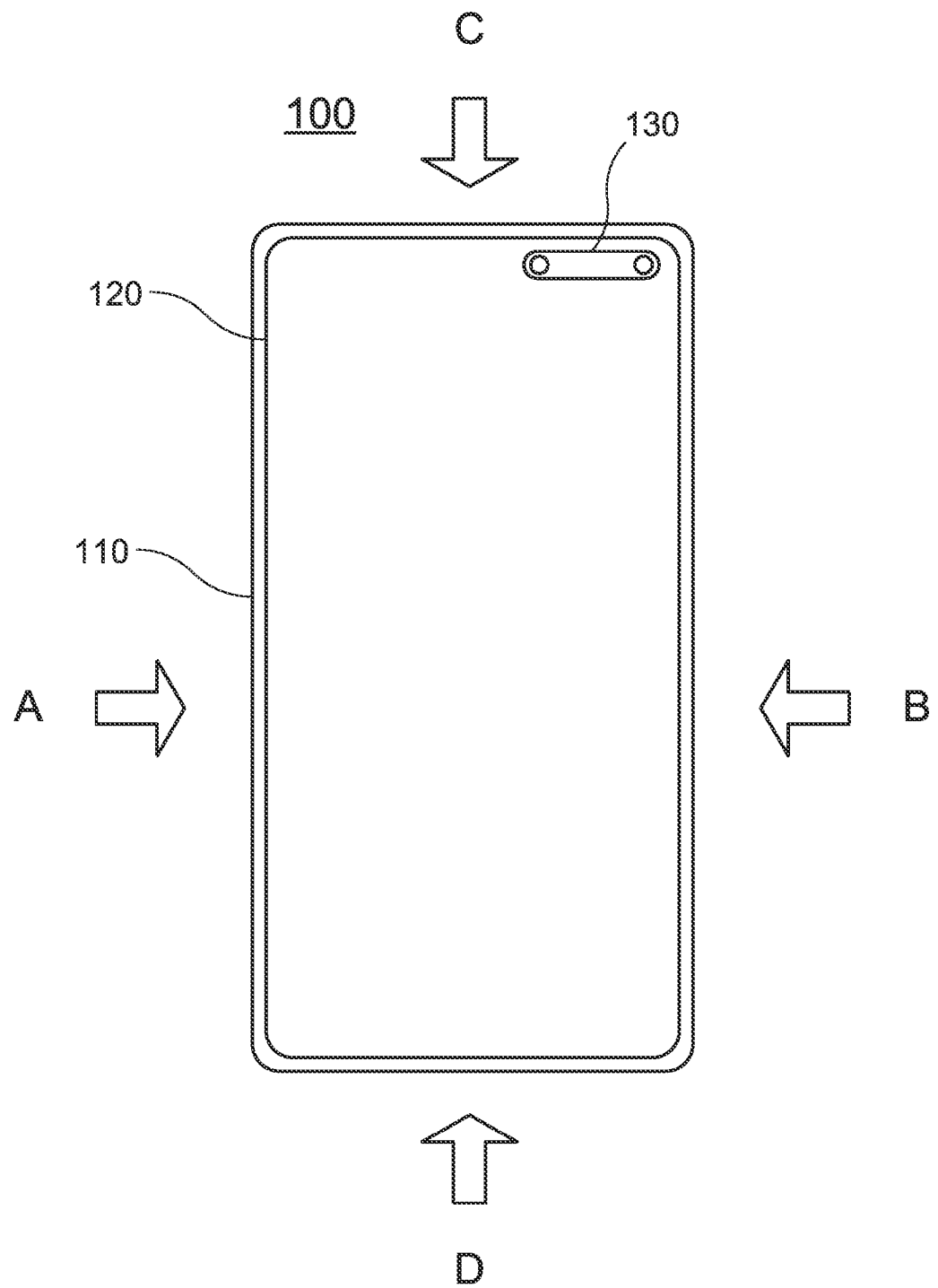
FIGS. 2A through 2F are diagrams schematically illustrating the exemplary configuration of the mobile communication terminal according to the embodiments of the technique of the present disclosure.
Figure 2B:
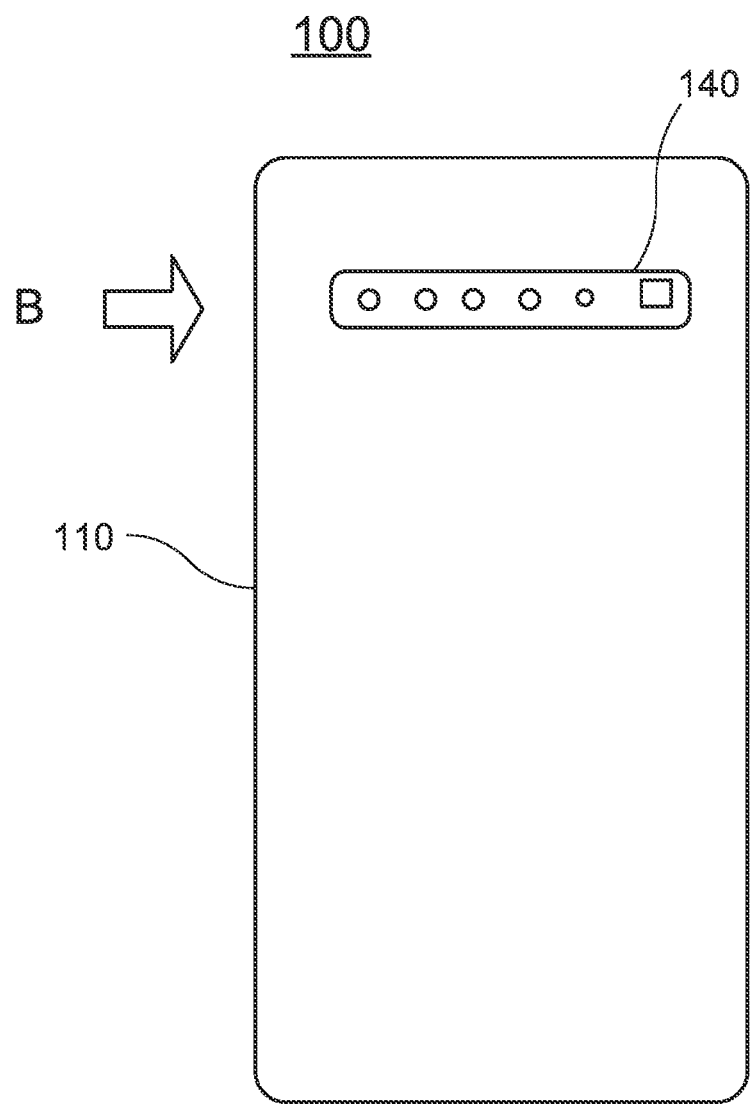
Figure 2C:
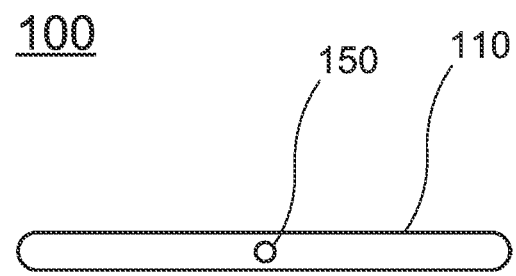
Figure 2D:
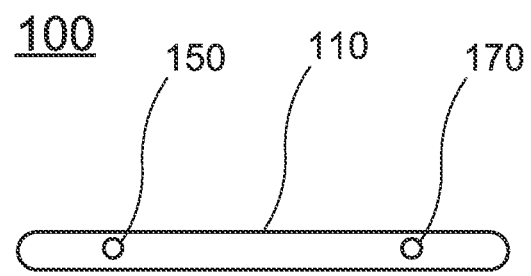
Figure 2E:
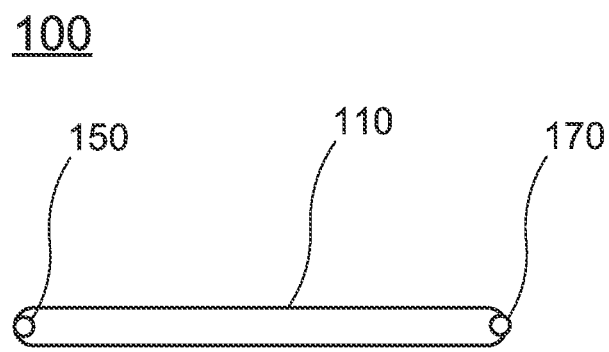
Figure 2F:
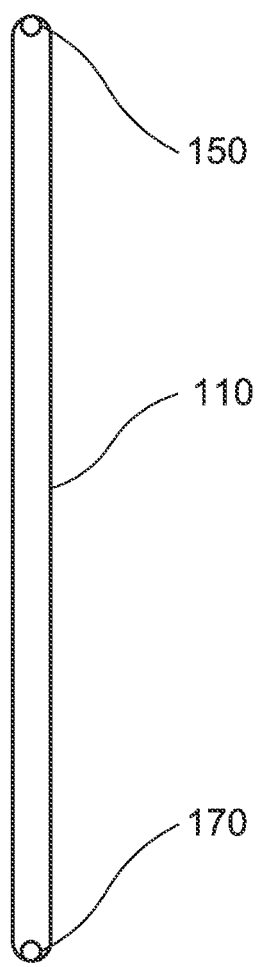

More specifically, FIG. 2A is a diagram illustrating a front view of the mobile communication terminal 100; FIG. 2B is a diagram illustrating a rear view of the mobile communication terminal 100; and FIGS. 2C through 2E are diagrams illustrating top views of the mobile communication terminal 100; and FIG. 2F is a diagram illustrating a right side view of the mobile communication terminal 100. The front view (front surface) and the right side view (right side surface) will be described later.

Referring to FIG. 1 and FIGS. 2A through 2F, the mobile communication terminal 100 according to the embodiments of the technique of the present disclosure includes a main body 110, a display 120, a first camera group 130, a second camera group 140, a third camera 150, and an operation processor 160. Further, referring to FIG. 1, the mobile communication terminal 100 may further include a fourth camera 170.

The main body 110 is made of, for example, materials such as metal, glass, and plastic.

The display 120 is provided on a front surface of the main body 110 and may include, for example, an organic light-emitting diode (OLED) display. The "front surface" of the main body 110 refers to a surface on which the display 120 is disposed among surfaces of the main body 110. Further, a "rear surface" refers to a surface opposite to the surface (i.e., the front surface) on which the display 120 is disposed among the surfaces of the main body 110. Meanwhile, in FIG. 2A, a left side surface of the main body 110 is indicated by an arrow "A," a right side surface of the main body 110 is indicated by an arrow "B," a top surface of the main body 110 is indicated by an arrow "C," and a bottom surface of the main body 110 is indicated by an arrow "D."

Figure 10A:
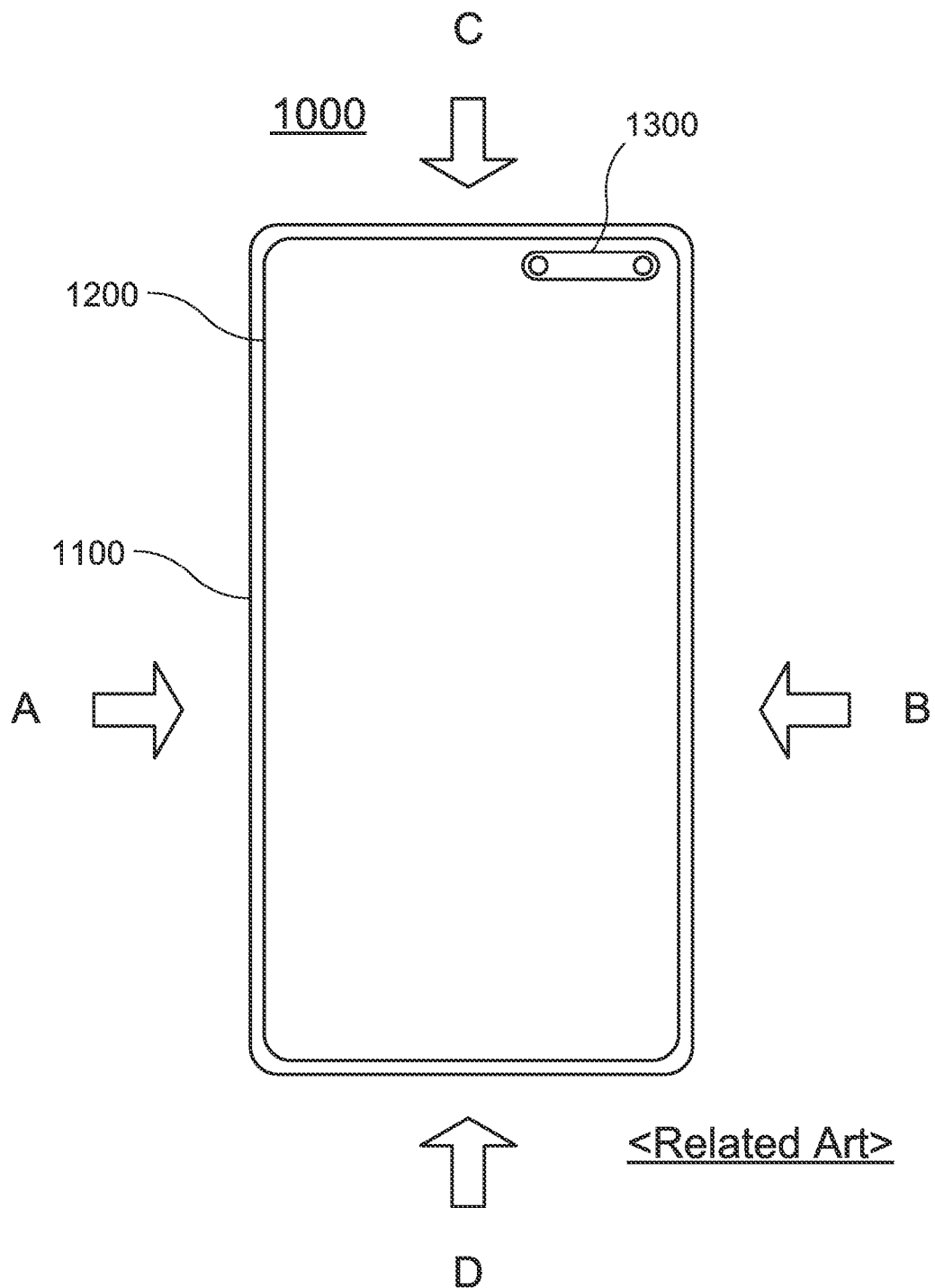
Figure 11A:
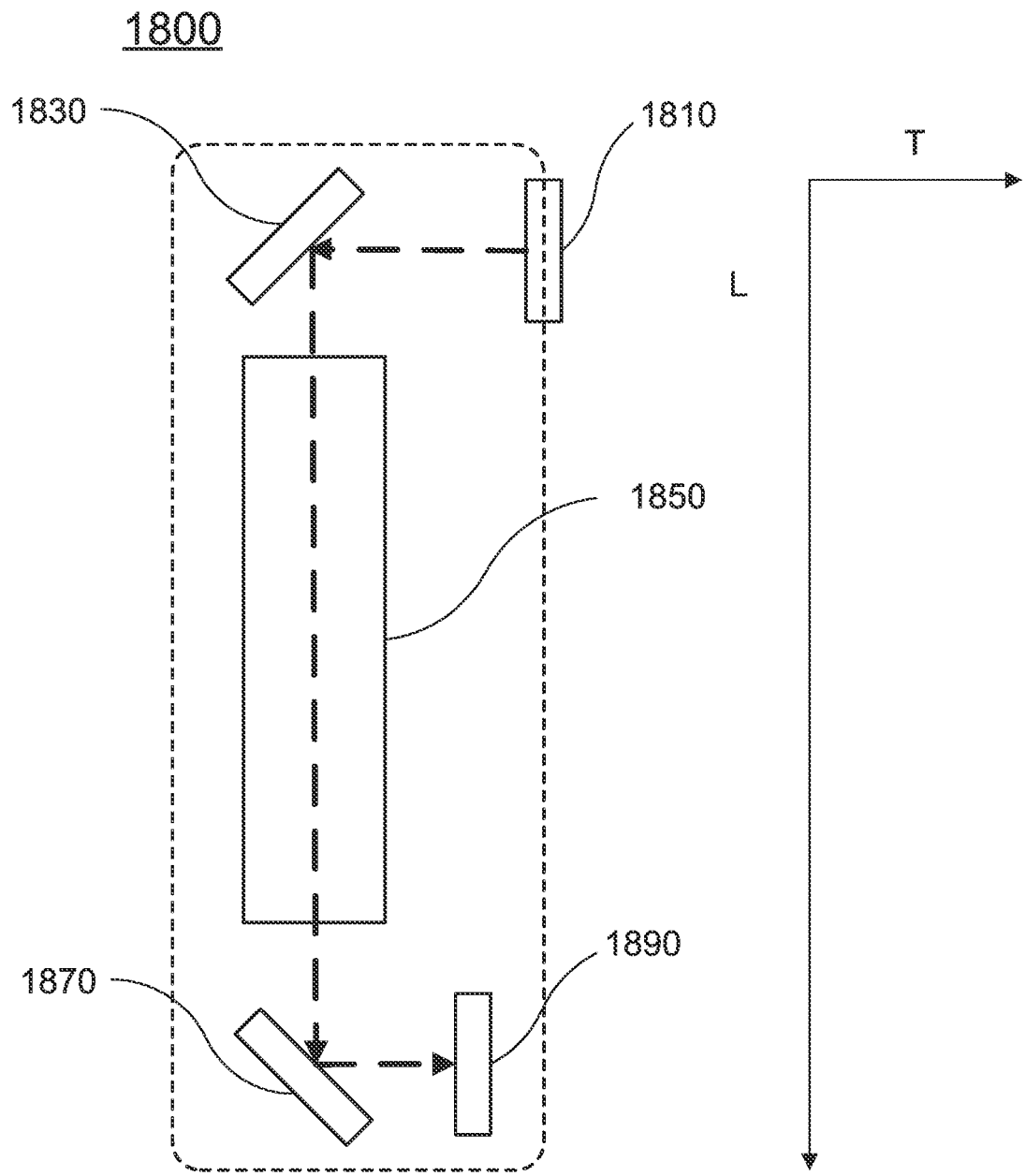
FIGS. 11A and 11B are diagrams schematically illustrating a configuration of a camera of the smart phone according to the comparative example.
Figure 11B:
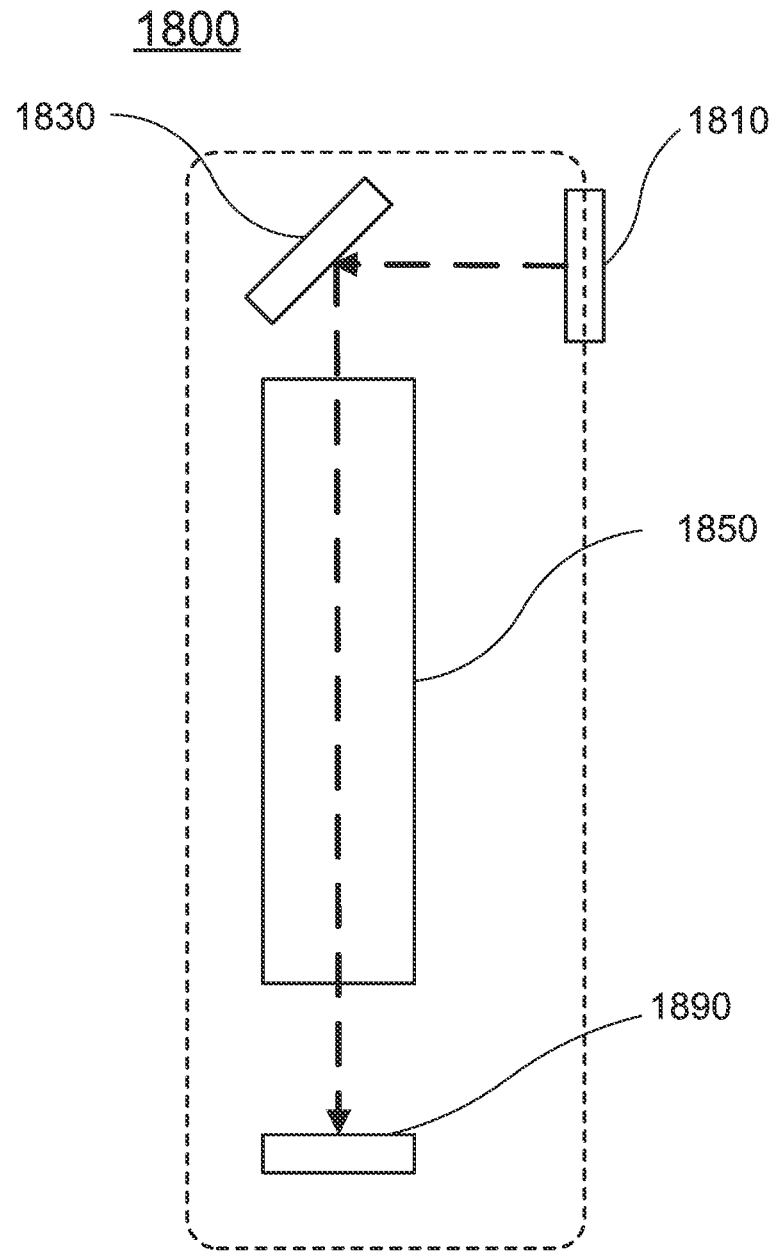

The first camera group 130 is disposed at the front surface of the main body 110 and includes one or more cameras. Since the first camera group 130 has a configuration that is substantially the same as, for example, a configuration of the front camera module 1300 described in FIG. 10A, a detailed description thereof will be omitted.

The second camera group 140 is disposed at the rear surface opposite to the front surface of the main body 110 and includes one or more cameras. Since the second camera group 130 has a configuration that is substantially the same as, for example, a configuration of the rear camera module 1400 described in FIG. 10B, a detailed description thereof will be omitted.

The third camera 150 is disposed at a first installation surface of the main body 110. The first installation surface is a surface selected from a group including the top surface of the main body 110; the left side surface of the main body 110; the right side surface of the main body 110; a corner portion located between the top surface and the left side surface of the main body 110 (hereinafter, also referred to as a "left upper corner portion"); and a corner portion located between the top surface and the right side surface of the main body 110 (hereinafter, also referred to as a "right upper corner portion").

For example, as shown in FIG. 2C, the third camera 150 may be disposed on a central portion of the top surface of the main body 110.

As another example, as shown in FIG. 2D, the third camera 150 may be disposed on a left side of the top surface of the main body 110. In this case, the fourth camera 170 to be described later may be disposed on a right side of the top surface of the main body 110.

As another example, as shown in FIG. 2E, the third camera 150 may be disposed on the left upper corner portion of the main body 110. In this case, the fourth camera 170 to be described later may be disposed on the right upper corner portion of the main body 110.

The operation processor 160 may be implemented by, for example, a semiconductor device such as a central processing unit (CPU). Further, the operation processor 160 may be implemented by a plurality of semiconductor devices. For example, some functions of the operation processor 160 may be implemented by a first CPU, and some other functions of the operation processor 160 may be implemented by a second CPU. A detailed configuration of the operation processor 160 will be described later.

As described above, the mobile communication terminal 100 may further include the fourth camera 170. The fourth camera 170 is disposed to be spaced apart from the third camera 150 at a second installation surface of the main body 110.

The second installation surface may be the same as the first installation surface at which the third camera 150 is disposed. For example, referring to FIG. 2D, the third camera 150 and the fourth camera 170 may be disposed at the top surface of the main body 110. Alternatively, if the left side surface of the main body 110 is used as the second installation surface as well as the first installation surface, the third camera 150 and the fourth camera 170 may be disposed at the left side surface of the main body 110. Further, alternatively, if the right side surface of the main body 110 is used as the second installation surface as well as the first installation surface, the third camera 150 and the fourth camera 170 may be disposed at the right side surface of the main body 110.

On the other hand, the second installation surface may be different from the first installation surface.

For example, one of the left upper corner portion of the main body 110 and the right upper corner portion of the main body 110 may be used as the first installation surface.

Referring to FIG. 2E, the third camera 150 is disposed on the left upper corner portion of the main body 110. If the left upper corner portion of the main body 110 is used as the first installation surface, either the right upper corner portion of the main body 110 or a corner portion located between the bottom surface and the left side surface of the main body 110 (hereinafter, also referred to as a "left lower corner portion") may be used as the second installation surface. FIG. 2E shows an example in which the fourth camera 170 is disposed on the right upper corner portion of the main body 110.

Referring to FIG. 2F, the third camera 150 is disposed on the right upper corner portion of the main body 110. If the right upper corner portion of the main body 110 is used as the first installation surface, either the left upper corner portion of the main body 110 or a corner portion located between the bottom surface and the right side surface of the main body 110 (hereinafter, also referred to as a "right lower corner portion") may be used as the second installation surface. FIG. 2F shows an example in which the fourth camera 170 is disposed on the right lower corner portion of the main body 110.

Figure 3A:
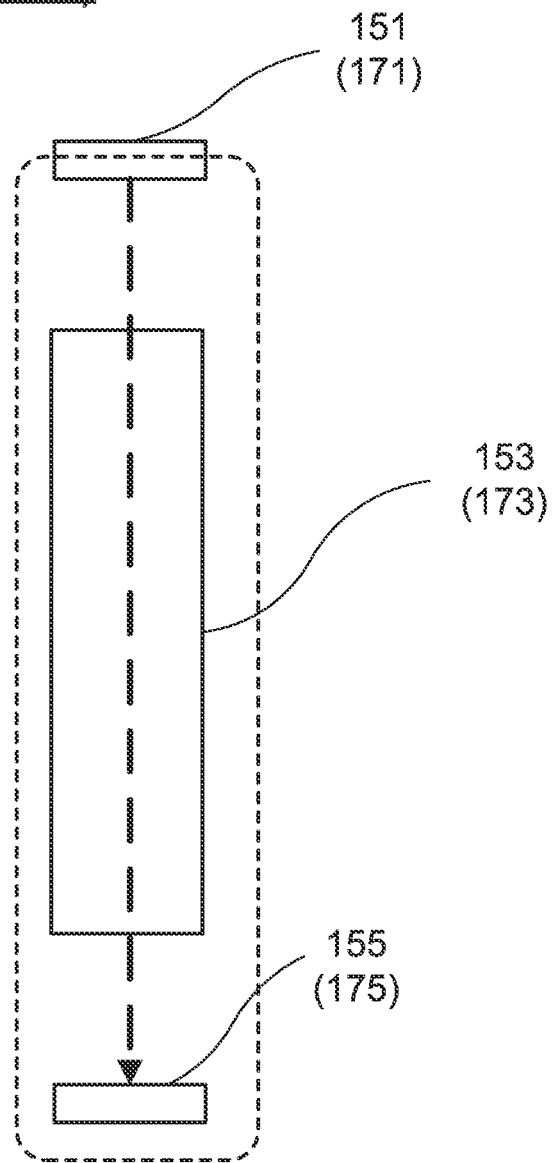
FIGS. 3A and 3B are diagrams schematically illustrating an exemplary configuration of a third camera (or a fourth camera) of the mobile communication terminal according to the embodiments of the technique of the present disclosure.
Figure 3B:
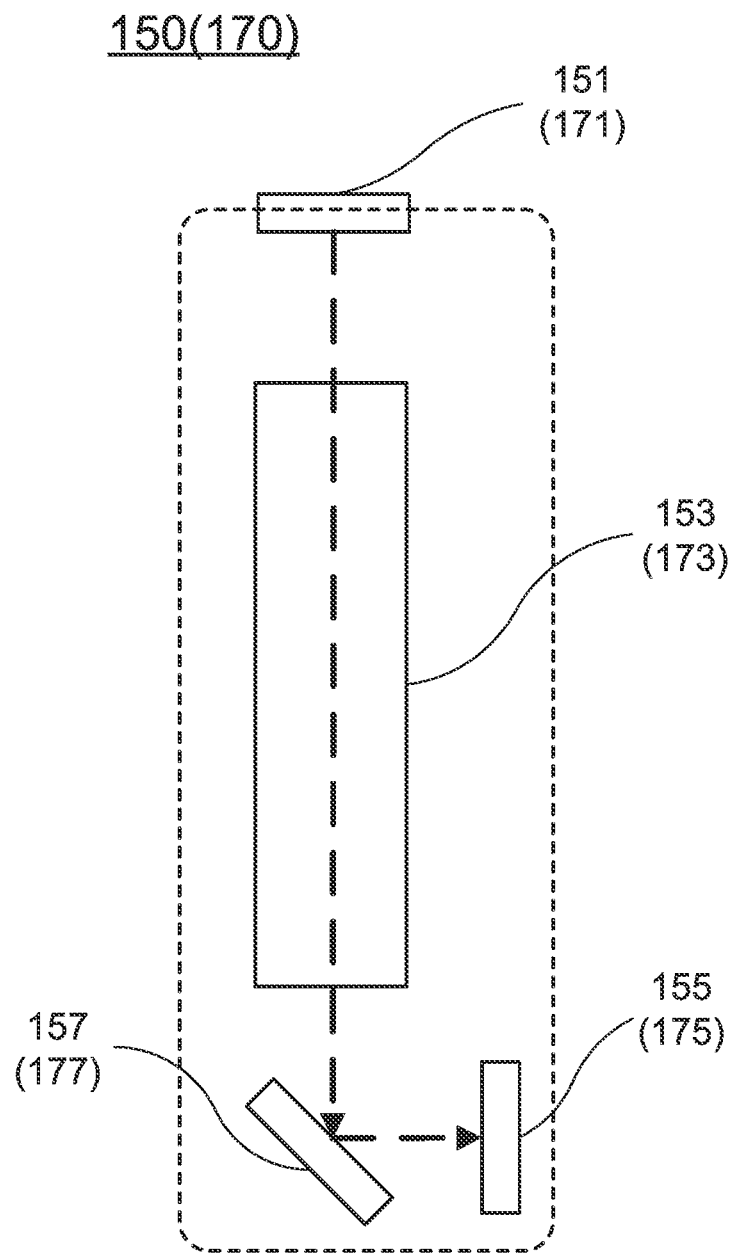

FIGS. 3A and 3B are diagrams schematically illustrating a configuration of the third camera 150 (or the fourth camera 170) of the mobile communication terminal 100 according to the embodiments of the technique of the present disclosure.

Referring to FIG. 3A, the third camera 150 includes a cover window 151, one or more lenses 153, and an image sensor 155. Referring to FIG. 3B, the third camera 150 may additionally include a reflector 157. Similarly, the fourth camera 170 includes a cover window 171, one or more lenses 173, and an image sensor 175. The fourth camera 170 may additionally include a reflector 177.

The configuration of the third camera 150 and the configuration of the fourth camera 170 are substantially the same. Therefore, the detailed configuration of the third camera 150 will be described, and a description of the detailed configuration of the fourth camera 170 will be omitted.

The cover window 151 is disposed at the first installation surface. The cover window 151 may be made of, for example, transparent plastic or glass. In this case, the cover window 171 is disposed at the second installation surface.

The one or more lenses 153 are arranged along an optical axis to transmit light incident through the cover window 151. For example, the one or more lenses 153 may include lenses such as liquid lenses and glass lenses. An overall refractive index of the one or more lenses 153 or a refractive index of each of the one or more lenses 153 is adjustable. For example, the overall refractive index of the one or more lenses 153 or the refractive index of each of the one or more lenses 153 may be adjusted in order to control an optical zoom or a focal length.

The image sensor 155 processes light passing through the one or more lenses 153 to obtain an image signal. The image sensor 155 may be formed of a semiconductor device such as a complementary metal oxide semiconductor (CMOS) image sensor.

Light incident from a target object passes through the cover window 151 and the one or more lenses 153 and is incident onto the image sensor 155. The image sensor 155 obtains an image signal by processing the incident light.

The reflector 157 reflects the light that has passed through the one or more lenses 153 to be incident onto the image sensor 155. The reflector 157 may include, for example, a beam splitter such as a prism. In particular, when it is difficult to arrange the image sensor 155 to receive light directly from the one or more lenses 153 due to a large size of the image sensor 155, the reflector 157 reflects the light that has passed through the one or more lenses 153 to be incident onto the image sensor 155.

FIG. 4 is a diagram illustrating an example of processes performed by the operation processor 160 of the mobile communication terminal 100 according to the embodiments of the technique of the present disclosure.

Referring to FIG. 4, the operation processor 160 performs a process P110 of displaying on the display 120 an image selected from among a first image received through the first camera group 130, a second image received through the second camera group 140, and a third image received through the third camera 150. For example, according to a user's selection, the operation processor 160 may display on the display 120 an image selected by the user from among the first image, the second image, and the third image.

In order to support the user in selecting an image, the operation processor 160 performs a process P120 of displaying on the display 120 a user interface for selecting one of the first image, the second image, and the third image and receiving a user's input through the user interface. When the user's input is received through the process P120, an image to be displayed on the display 120 may be selected in the process P110 based on the user's input.

Figure 5:
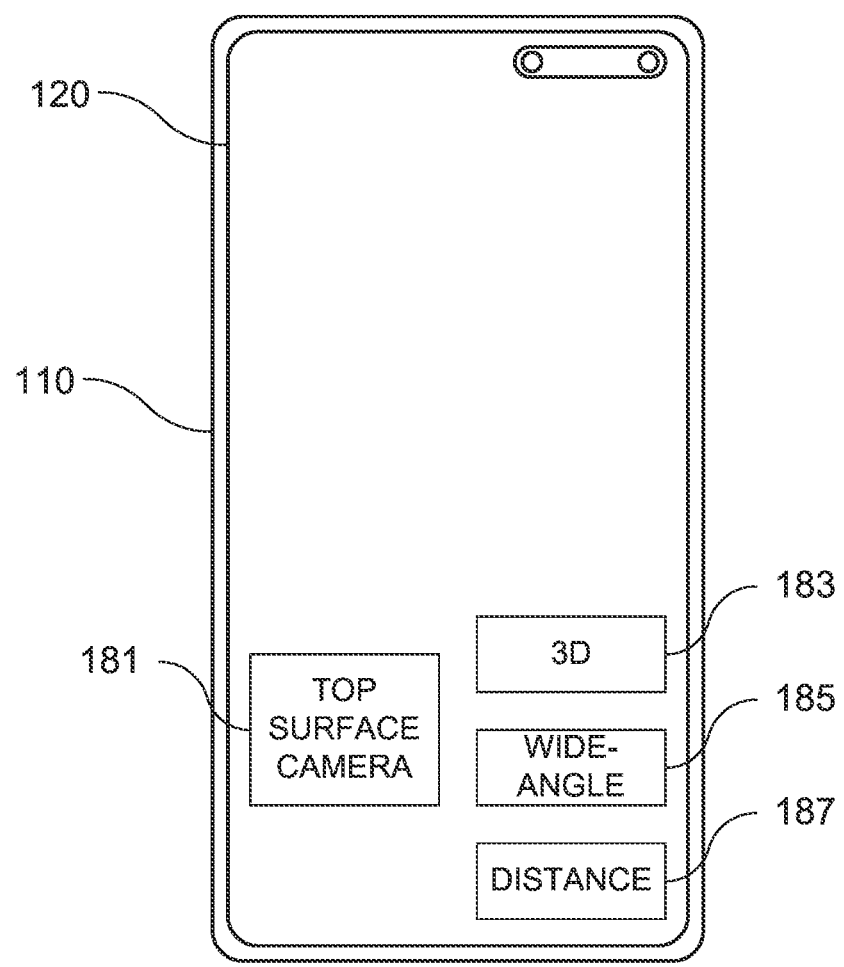
FIG. 5 is a diagram schematically illustrating a user interface displayed on a display of the mobile communication terminal according to the embodiments of the technique of the present disclosure.

FIG. 5 is a diagram schematically illustrating a user interface displayed on the display 120 of the mobile communication terminal 100 according to the embodiments of the technique of the present disclosure.

Referring to FIG. 5, the user interface includes a first user interface 181 (also simply referred to as a "user interface 181") for selecting any one of the first image, the second image, and the third image; a second user interface 183 (also simply referred to as a "user interface 183") for selecting a three-dimensional image; a third user interface 185 (also simply referred to as a "user interface 185") for selecting a wide-angle image; and a fourth user interface 187 (also simply referred to as a "user interface 187") for measuring a distance from the mobile communication terminal 100 (cameras) to the target object.

Each of the user interfaces 181, 183, 185 and 187 may include, for example, buttons. For example, when a user's input is received through the user interface 181, the first image, the second image, and the third image may be sequentially selected to be displayed on the display 120. For example, when a user's input is received through the user interface 183, the three-dimensional image may be selected. The wide-angle image and the distance from the mobile communication terminal 100 to the target object may be selected through the user interface 185 and the user interface 187, respectively.

Figure 6:
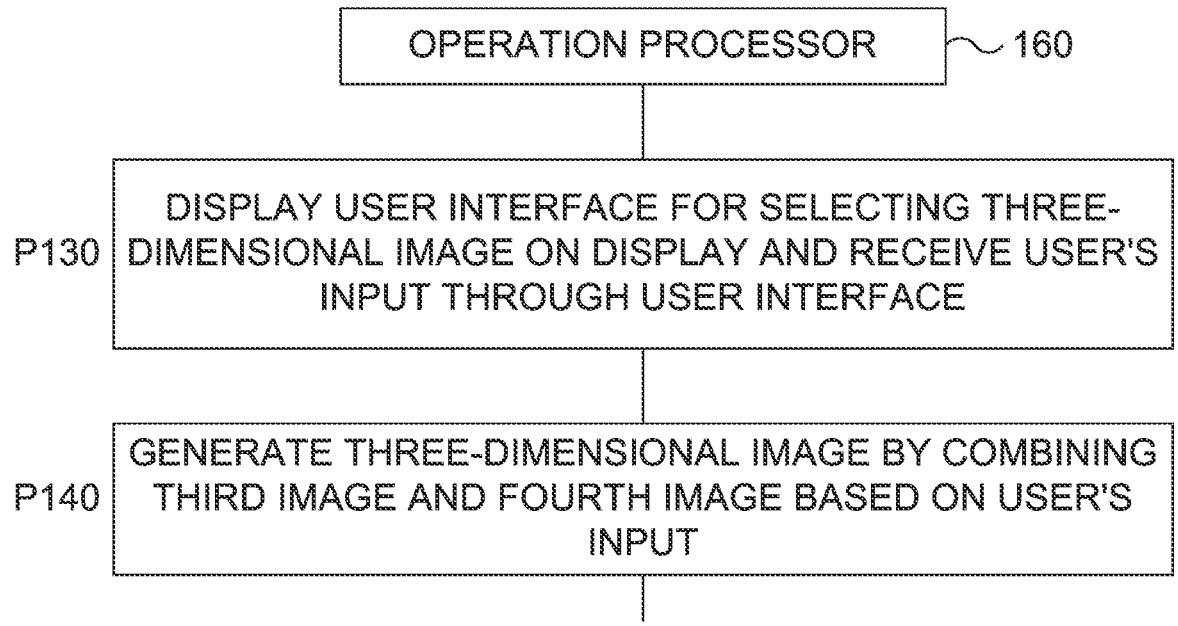
FIG. 6 is a diagram illustrating another example of processes performed by the operation processor of the mobile communication terminal according to the embodiments of the technique of the present disclosure.

FIG. 6 is a diagram illustrating another example of processes performed by the operation processor 160 of the mobile communication terminal 100 according to the embodiments of the technique of the present disclosure.

Referring to FIG. 6, the operation processor 160 performs a process P130 of displaying on the display 120 the user interface 183 for selecting a three-dimensional image and receiving a user's input through the user interface 183 and a process P140 of generating the three-dimensional image by combining the third image and the fourth image received through the fourth camera 170 based on the user's input received through the process P130.

In such configuration of the mobile communication terminal 100, as shown in FIGS. 2E and 2F, a distance (interval) between the third camera 150 and the fourth camera 170 may be set to be, for example, a distance between the left upper corner portion of the main body 110 and the right upper corner portion of the main body 110 or a distance between the right upper corner portion of the main body 110 and the right lower corner portion of the main body 110. Therefore, the operation processor 160 may generate a three-dimensional image with highly reliable binocular disparity by using the third camera 150 and the fourth camera 170.

Figure 7:
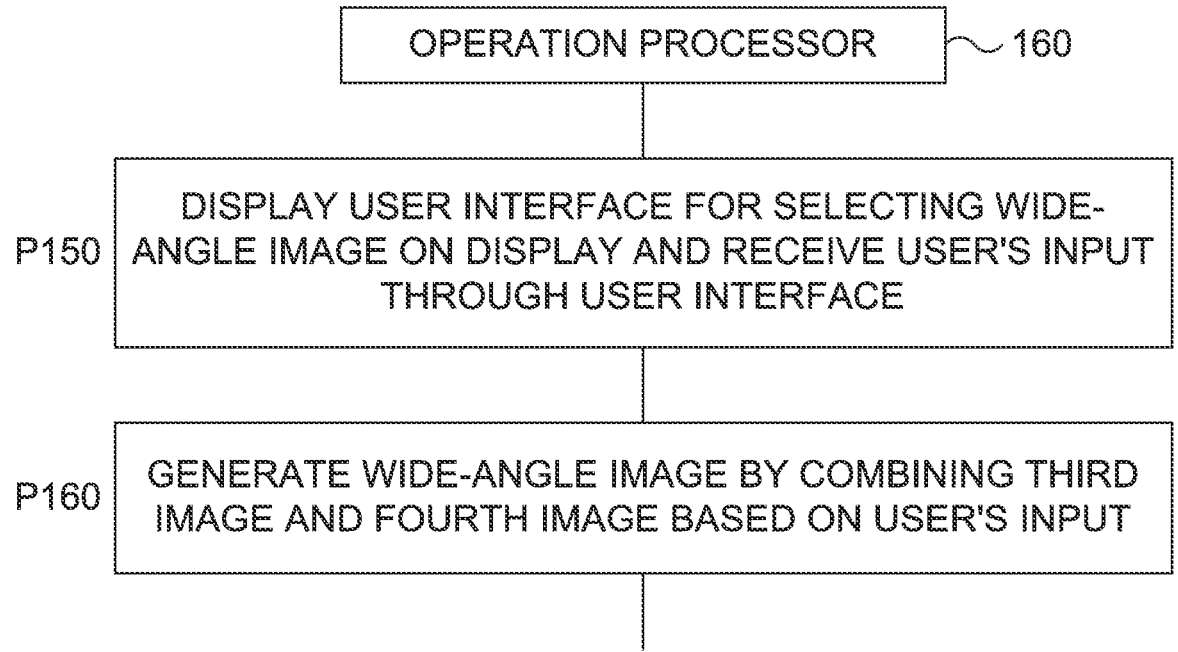
FIG. 7 is a diagram illustrating still another example of processes performed by the operation processor of the mobile communication terminal according to the embodiments of the technique of the present disclosure.

FIG. 7 is a diagram illustrating still another example of processes performed by the operation processor 160 of the mobile communication terminal 100 according to the embodiments of the technique of the present disclosure.

Referring to FIG. 7, the operation processor 160 performs a process P150 of displaying on the display 120 the user interface 185 for selecting a wide-angle image and receiving a user's input through the user interface 185 and a process P160 of generating the wide-angle image by combining the third image and the fourth image based on the user's input received through the process P150.

Figure 8:
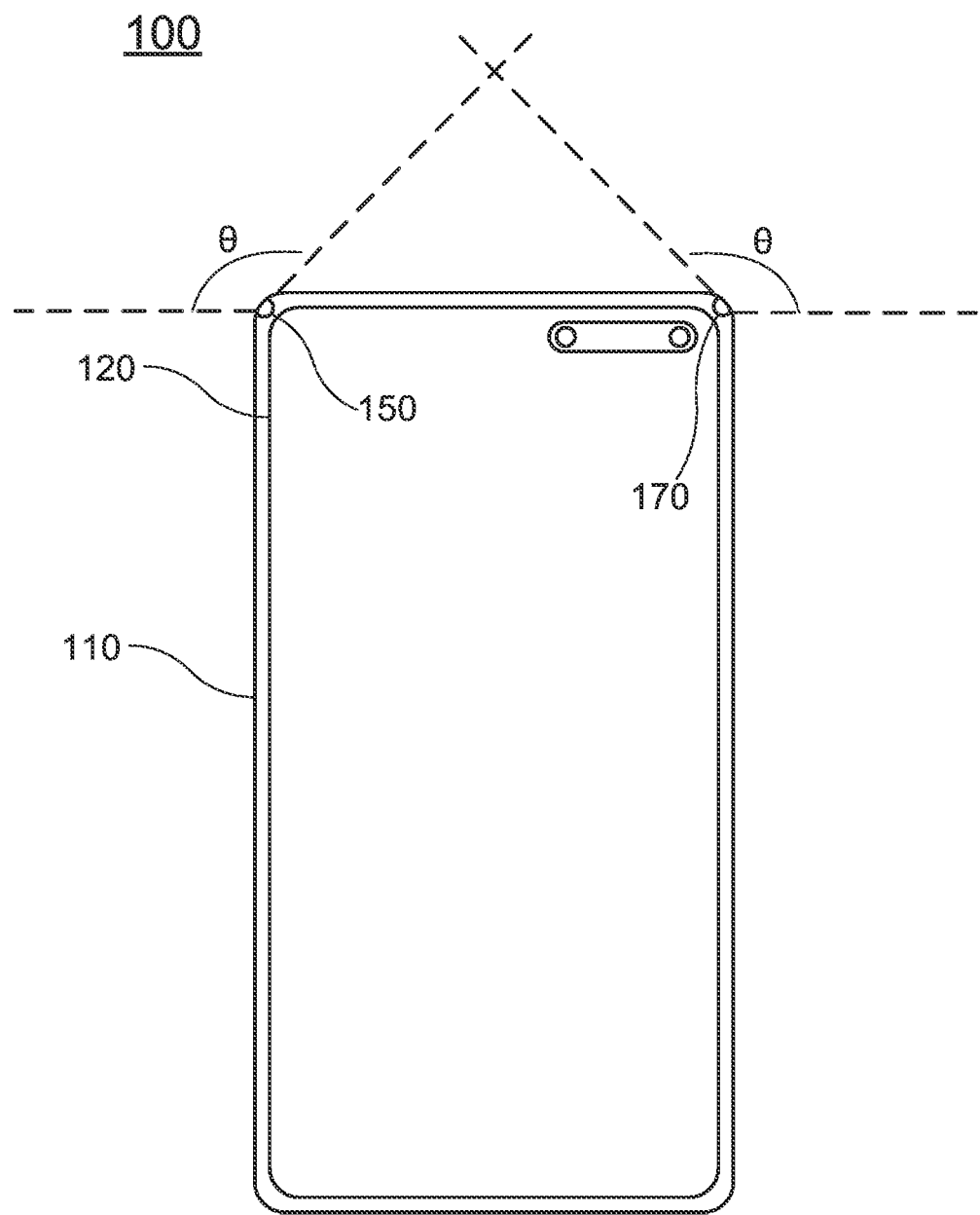
FIG. 8 is a diagram schematically illustrating an example of obtaining a wide-angle image by the third camera and the fourth camera of the mobile communication terminal according to the embodiments of the technique of the present disclosure.

FIG. 8 is a diagram schematically illustrating an example of obtaining the wide-angle image by the third camera 150 and the fourth camera 170 of the mobile communication terminal 100 according to the embodiments of the technique of the present disclosure.

Referring to FIG. 8, the wide-angle image may be obtained by using a wide angle θ of each of the third camera 150 and the fourth camera 170.

Referring to FIG. 8, the third camera 150 and the fourth camera 170 may be respectively disposed on the left upper corner portion of the main body 110 and the right upper corner portion of the main body 110. The distance (interval) between the third camera 150 and the fourth camera 170 may be determined by, for example, the distance between the left upper corner portion of the main body 110 and the right upper corner portion of the main body 110. If the third camera 150 and the fourth camera 170 are respectively disposed on the right upper corner portion of the main body 110 and the right lower corner portion of the main body 110, the distance (interval) between the third camera 150 and the fourth camera 170 may be determined by, for example, the distance between the right upper corner portion of the main body 110 and the right lower corner portion of the main body 110. Accordingly, the operation processor 160 may easily generate a wide-angle image that includes a wider range by using the third camera 150 and the fourth camera 170.

Figure 9:
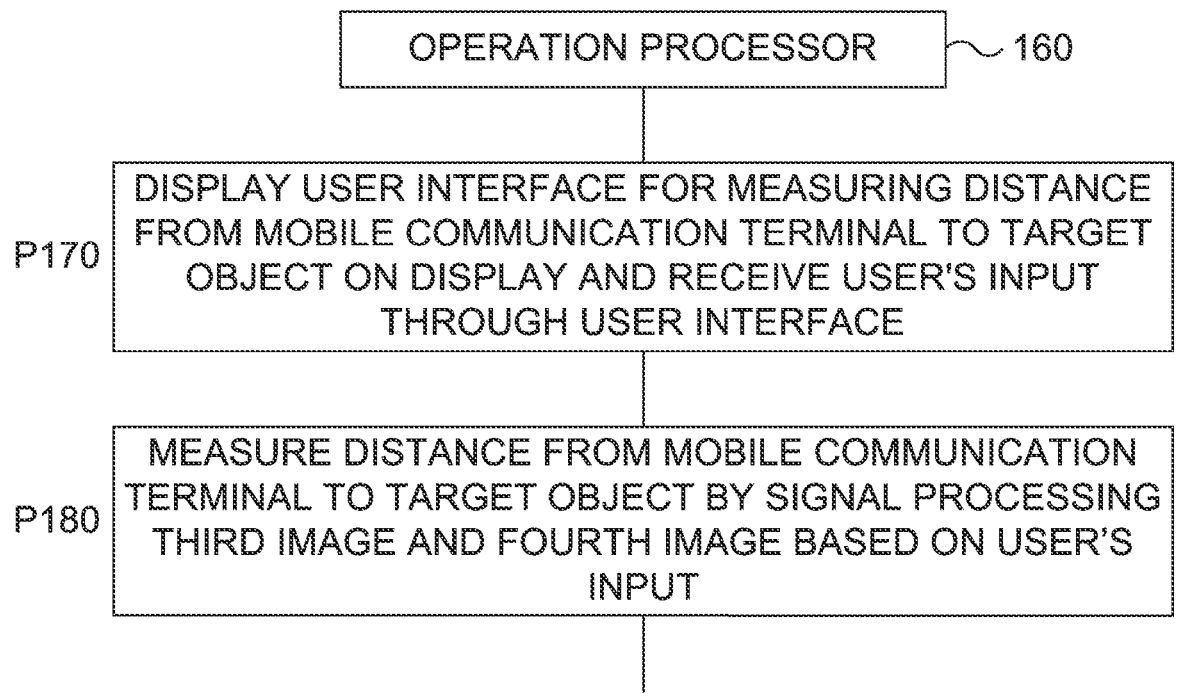
FIG. 9 is a diagram illustrating still another example of processes performed by the operation processor of the mobile communication terminal according to the embodiments of the technique of the present disclosure.

FIG. 9 is a diagram illustrating still another example of processes performed by the operation processor 160 of the mobile communication terminal 100 according to the embodiments of the technique of the present disclosure.

Referring to FIG. 9, the operation processor 160 performs a process P170 of displaying on the display 120 the user interface 187 for measuring a distance from the mobile communication terminal 100 (cameras) to the target object and receiving a user's input through the user interface 187 and a process P180 of measuring the distance from the mobile communication terminal 100 to the target object by signal processing the third image and the fourth image based on the user's input received through the process P170.

In such configuration of the mobile communication terminal 100, as shown in FIGS. 2E and 2F, the distance (interval) between the third camera 150 and the fourth camera 170 may be set to be, for example, the distance between the left upper corner portion of the main body 110 and the right upper corner portion of the main body 110 or the distance between the right upper corner portion of the main body 110 and the right lower corner portion of the main body 110. Therefore, the operation processor 160 may more accurately and easily measure the distance from the mobile communication terminal 100 to the target object by using the third camera 150 and the fourth camera 170.

OTHER EMBODIMENTS

While the technique of the present disclosure is described in detail by way of the embodiments described above, the technique of the present disclosure is not limited thereto and may be modified in various ways without departing from the scope thereof.

For example, the technique of the present disclosure may also be applied to a method of providing an image using the mobile communication terminal described above.

According to the technique of the present disclosure, there may be provided a method of providing an image using a mobile communication terminal including a main body; a display disposed at a front surface of the main body; a first camera group disposed at the front surface of the main body and including one or more cameras; a second camera group disposed at a rear surface of the main body that is opposite to the front surface of the main body and including one or more cameras; and a third camera disposed at a first installation surface of the main body, the first installation surface being different from the front surface and the rear surface. The method includes (a) displaying on the display an image selected from among a first image received through the first camera group, a second image received through the second camera group, and a third image received through the third camera.

Specific technical features of the method of providing the image using the mobile communication terminal according to the technique of the present disclosure are substantially the same as the features of the mobile communication terminal according to the technique of the present disclosure. Accordingly, detailed descriptions of the method of providing the image using the mobile communication terminal according to the technique of the present disclosure will be omitted.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

According to some embodiments of the technique of the present disclosure, it is possible to provide a mobile communication terminal capable of smoothly capturing an image such as an optical zoom image by using one or more cameras disposed at an installation surface different from a front surface on which a display is disposed and a rear surface opposite to the front surface among six surfaces of a main body of the mobile communication terminal; smoothly capturing a three-dimensional image by using two cameras that are respectively disposed at a first installation surface and a second installation surface to be spaced apart from each other; accurately measuring a distance from the cameras to a target object; and smoothly capturing a wide-angle image or an ultrawide-angle image.

What is claimed is:

1. A mobile communication terminal comprising:
a main body;
a display disposed at a front surface of the main body;
a first camera group disposed at the front surface of the main body and including one or more cameras;
a second camera group disposed at a rear surface of the main body that is opposite to the front surface of the main body and including one or more cameras;
a third camera disposed at a first installation surface of the main body, the first installation surface being different from the front surface and the rear surface; and
an operation processor configured to:
(a) display on the display an image selected from among a first image received through the first camera group, a second image received through the second camera group, and a third image received through the third camera,
wherein the third camera includes:
a cover window disposed at the first installation surface;
one or more lenses that transmit light incident through the cover window; and
an image sensor that processes the light passing through the one or more lenses to obtain an image signal.

2. The mobile communication terminal of claim 1, wherein the first installation surface is a surface selected from a group including a top surface of the main body; a left side surface of the main body; a right side surface of the main body; a left upper corner portion located between the top surface and the left side surface of the main body; and a right upper corner portion located between the top surface and the right side surface of the main body.

3. The mobile communication terminal of claim 1, wherein a refractive index of the one or more lenses is adjustable.

4. The mobile communication terminal of claim 1, wherein the third camera further includes a reflector reflects the light passing through the one or more lenses to be incident onto the image sensor.

5. The mobile communication terminal of claim 1, wherein the operation processor is further configured to:
(b) display on the display a user interface for selecting one of the first image, the second image, and the third image, and receive a user's input through the user interface,
wherein (a) comprises (a-1) the image to be displayed on the display is selected based on the user's input.

6. The mobile communication terminal of claim 1, further comprising:
a fourth camera disposed to be spaced apart from the third camera at a second installation surface of the main body.

7. The mobile communication terminal of claim 6, wherein the second installation surface is same as the first installation surface.

8. The mobile communication terminal of claim 6, wherein the first installation surface is either a left upper corner portion located between a top surface and a left side surface of the main body or a right upper corner portion located between the top surface and a right side surface of the main body,
wherein, in a case where the first installation surface is the left upper corner portion, the second installation surface is either the right upper corner portion or a left lower corner portion located between a bottom surface and the left side surface of the main body, and
wherein, in a case where the first installation surface is the right upper corner portion, the second installation surface is either the left upper corner portion or a right lower corner portion located between the bottom surface and the right side surface of the main body.

9. The mobile communication terminal of claim 6, wherein the fourth camera includes:
a cover window disposed at the second installation surface;
one or more lenses that transmit light incident through the cover window; and
an image sensor that processes the light passing through the one or more lenses to obtain an image signal.

10. The mobile communication terminal of claim 9, wherein a refractive index of the one or more lenses is adjustable.

11. The mobile communication terminal of claim 9, wherein the fourth camera further includes a reflector that reflects the light passing through the one or more lenses to be incident onto the image sensor.

12. The mobile communication terminal of claim 6, wherein the operation processor is further configured to:
(c) display on the display a user interface for selecting a three-dimensional image and receive a user's input through the user interface, and
(d) generate the three-dimensional image by combining the third image and a fourth image received through the fourth camera based on the user's input.

13. The mobile communication terminal of claim 6, wherein the operation processor is further configured to:
(e) display on the display a user interface for selecting a wide-angle image and receive a user's input through the user interface, and
(f) generate the wide-angle image by combining the third image and a fourth image received through the fourth camera based on the user's input.

14. The mobile communication terminal of claim 6, wherein the operation processor is further configured to:
(g) display on the display a user interface for measuring a distance from the mobile communication terminal to a target object and receive a user's input through the user interface, and
(h) measure a distance from the mobile communication terminal to the target object by signal processing the third image and a fourth image received through the fourth camera based on the user's input.

* * * * *